US006589136B2

(12) United States Patent
Ephraim et al.

(10) Patent No.: US 6,589,136 B2
(45) Date of Patent: Jul. 8, 2003

(54) ENGINE POWER BOOST CONTROL SYSTEM

(75) Inventors: Stephen Russell Ephraim, Cedar Falls, IA (US); James Anton Miller, Cedar Falls, IA (US); Marvin Kenneth Farr, Waverly, IA (US); Michael John Pipho, Dunkerton, IA (US)

(73) Assignee: Deere & Company, Moline, IL (US)

( * ) Notice: Subject to any disclaimer, the term of this patent is extended or adjusted under 35 U.S.C. 154(b) by 152 days.

(21) Appl. No.: 09/800,848

(22) Filed: Mar. 6, 2001

(65) Prior Publication Data

US 2002/0124830 A1 Sep. 12, 2002

(51) Int. Cl.[7] .......................... F02O 41/30; B60K 41/04

(52) U.S. Cl. .......................... 477/111; 701/104; 701/54; 123/350

(58) Field of Search ................................ 123/350, 396; 701/104, 110, 102, 54; 477/111

(56) References Cited

U.S. PATENT DOCUMENTS

| | | | | |
|---|---|---|---|---|
| 4,522,553 A | | 6/1985 | Nelson et al. | 414/526 |
| 5,508,923 A | | 4/1996 | Ibamoto et al. | 364/426.01 |
| 5,715,790 A | | 2/1998 | Tolley et al. | 123/396 |
| 6,199,006 B1 | | 3/2001 | Weiss et al. | 701/102 |
| 6,347,272 B2 | * | 2/2002 | Flammersfeld et al. | 701/93 |

OTHER PUBLICATIONS

Marvin Farr, "Electronic Controls for John Deere Diesel Engines", Feb. 27, 1989, pp. 13–16 & 21.

Deere & Company, Engine Control System Specification—Rev. 2B, Sep. 1989 (3 pages).

Agricultural Engineering, "50 Outstanding Innovations—1991 ——Engine Helps Maintain Speed During Harvesting", (date unknown), (2 pages).

* cited by examiner

*Primary Examiner*—Dirk Wright
*Assistant Examiner*—Arnold Castro

(57) ABSTRACT

A power boost control system is provided for an agricultural vehicle with an engine which is normally governor controlled to run at throttle-selected constant engine speed up to a normal or rated engine speed. The power boost control system receives a road speed signal. Power boost is enabled if the sensed road speed is greater than an "on" threshold, above which is considered to be a transport speed. Power boost is disabled if sensed road speed is less than an "off" threshold, below which is considered to be less than a transport speed. When power boost is enabled, the controller will increase maximum power limits to above normal levels, so that, for example, the desired road or transport speed can be maintained as the vehicle goes up a hill.

15 Claims, 13 Drawing Sheets

| UP (mph) | DOWN (mph) | VALUE |
|---|---|---|
| <30 | <25 | BOOST OFF |
| 30 | 25 | POWER BOOST LEVEL 1 |
| 35 | 28 | POWER BOOST LEVEL 2 |
| 40 | 33 | POWER BOOST LEVEL 3 |

Fig. 9

GEAR

| SLEW RATE, DECREASING RPM/SEC | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0* | | | | | | | | | | | 1.00 | 1.00 | 1.00 | 1.01 | 1.02 | 1.06 |
| −10 | | | | | | | | | | | 1.00 | 1.00 | 1.01 | 1.02 | 1.04 | 1.07 |
| −20 | | | | | | | | | | | 1.00 | 1.01 | 1.02 | 1.03 | 1.05 | 1.08 |
| −30 | | | | | | | | | | | 1.02 | 1.03 | 1.03 | 1.04 | 1.06 | 1.09 |
| −40 | | | | | | | | | | | 1.04 | 1.05 | 1.04 | 1.05 | 1.07 | 1.10 |
| −50 | | | | | | | | | | | 1.07 | 1.07 | 1.05 | 1.06 | 1.08 | 1.11 |
| −60 | | | | | | | | | | | 1.10 | 1.09 | 1.06 | 1.07 | 1.09 | 1.12 |
| −70 | | | | | | | | | | | 1.10 | 1.10 | 1.07 | 1.08 | 1.10 | 1.13 |
| −80 | | | | | | | | | | | 1.10 | 1.10 | 1.08 | 1.09 | 1.11 | 1.13 |
| −90 | | | | | | | | | | | 1.10 | 1.10 | 1.09 | 1.10 | 1.11 | 1.13 |
| −100 | | | | | | | | | | | 1.10 | 1.10 | 1.10 | 1.10 | 1.11 | 1.13 |

* ZERO OR INCREASING

ENGINE POWER BOOST CONTROL SYSTEM

BACKGROUND OF THE INVENTION

The invention relates to an engine power boost control system.

Utility vehicles, such as agricultural tractors have been designed in recent years to run at higher road speeds in response to customer demands for reduced hauling times and quicker delivery of tractors to the field for work. To make the tractor more suitable for these higher speeds, manufacturers have introduced new suspension systems, brakes, and steering systems. A further consideration is the increased engine power demanded to navigate hills at higher speeds for a given tractor size. Typical methods for increasing engine power involve larger and more expensive engines, cooling systems, mufflers, air cleaners, and hood enclosures. These methods for achieving power are costly and may compromise important features of the tractor, such as visibility from the operator's seat to the field rows, above and on either side of the engine enclosure, and maintaining a compact turning radius. For this reason, manufacturers are inclined to offer higher speed options without an engine power increase. Nonetheless, customers desire that the engine power should be commensurate with the higher transport speed, and that when road loads are encountered in cases such as hill climbing, that the tractor should maintain a higher speed than a previous, slower speed tractor. Thus, there is a need for an engine power boost operable in connection with higher transport speeds.

An engine power boost system for a combine which boosts engine power when the grain auger is engaged is described in U.S. Pat. No. 4,522,553 issued in 1985 and assigned to the assignee of this application. Power boost has also been used to assist hydrostatic steering efforts in the John Deere 9000 Series rubber-tracked tractor, such as described in U.S. Pat. No. 6,138,782 issued Oct. 31, 2000 and assigned to the assignee of this application (Attorney's Docket No. 14746-US). Construction equipment, such as the John Deere 772CH Grader, have employed multiple engine power curves as a function of gear and whether or not front wheel drive is selected.

Since 1989, John Deere 9000 series production combines have included a power boost control system which includes an ON timer and an OFF timer to control the on time and off time of power boost operation. A similar power boost control function is described in U.S. Pat. No. 5,715,790, filed on Oct. 22, 1996 and issued Feb. 10, 1998 to Tolley et al. The '790 patent describes an engine power boost control system with a pair of timers to control the on time and off time of power boost operation of a compression-ignition engine which is normally controlled to run at throttle-selected constant engine speed up to a normal or rated engine speed. The system described by the '790 patent is responsive to a manually operated output demand control and sensed engine speed, is enabled in response to a manually operated power boost demand control, and appears to be primarily intended for use during a plowing operation of an agricultural tractor.

Automotive and truck cruise control systems are well known, but such systems are not used with engines which are governor controlled to operate at a rated engine speed.

However, none of these systems provides a power boost function designed specifically to function in connection with higher vehicle transport or road speeds of an agricultural tractor with an engine which is governor controlled to run at a constant throttle-selected engine speed up to a normal or rated engine speed. Also, none of these systems provides a power boost system which is responsive to sensed parameters, such as transmission gear ratio, commanded or sensed vehicle speed, or various engine-related sensed temperatures. Thus, there remains a need for an engine power boost system designed specifically for an agricultural tractor operating at transport speeds. And, there remains a need for an engine power boost system which is responsive to various sensed parameters.

SUMMARY OF THE INVENTION

Accordingly, an object of this invention is to provide an engine power boost system designed for an agricultural tractor operating at transport speeds.

A further object of the invention is to provide such an engine power boost system for an agricultural tractor with an engine which is normally governor controlled to run at throttle-selected constant engine speed up to a normal or rated engine speed.

Another object of the invention is to provide such an engine power boost system which is responsive to sensed parameters, such as transmission gear ratio, commanded or sensed vehicle speed, and/or various sensed engine-related temperatures These and other objects are achieved by the present invention, wherein a power boost control system is provided for a compression-ignition engine which is normally governor controlled to run at throttle-selected constant engine speed up to a normal or rated engine speed. The power boost control system receives a road speed signal, and power boost is disabled upon startup. Power boost is enabled if sensed road speed is greater than a first or "on" threshold, above which is considered to be a transport speed. Power boost is disabled if sensed road speed is less than a second or "off" threshold, below which is considered to be less than a transport speed. When power boost is enabled, the engine governor will increase engine power levels to above normal levels, so that, for example, the desired road or transport speed can be maintained as the vehicle goes up a hill. The "on" threshold is preferably greater than the "of" threshold to prevent the system from "hunting" or constantly enabling and disabling power boost. Different amounts of power boost can be enabled and disabled as a function of different pairs of "on" and "off" thresholds. In alternative embodiments of the invention, engine power boost may be controlled as function of sensed or calculated transmission gear ratio and/or of various sensed temperatures associated with the engine.

BRIEF DESCRIPTION OF THE DRAWINGS

FIG. 9 is a tabular representation of a lookup table used by the present invention, wherein different fuel rate multiplier values are associated with different gears and with different values of slew rates;

DESCRIPTION OF THE PREFERRED EMBODIMENT

Figure 1A:
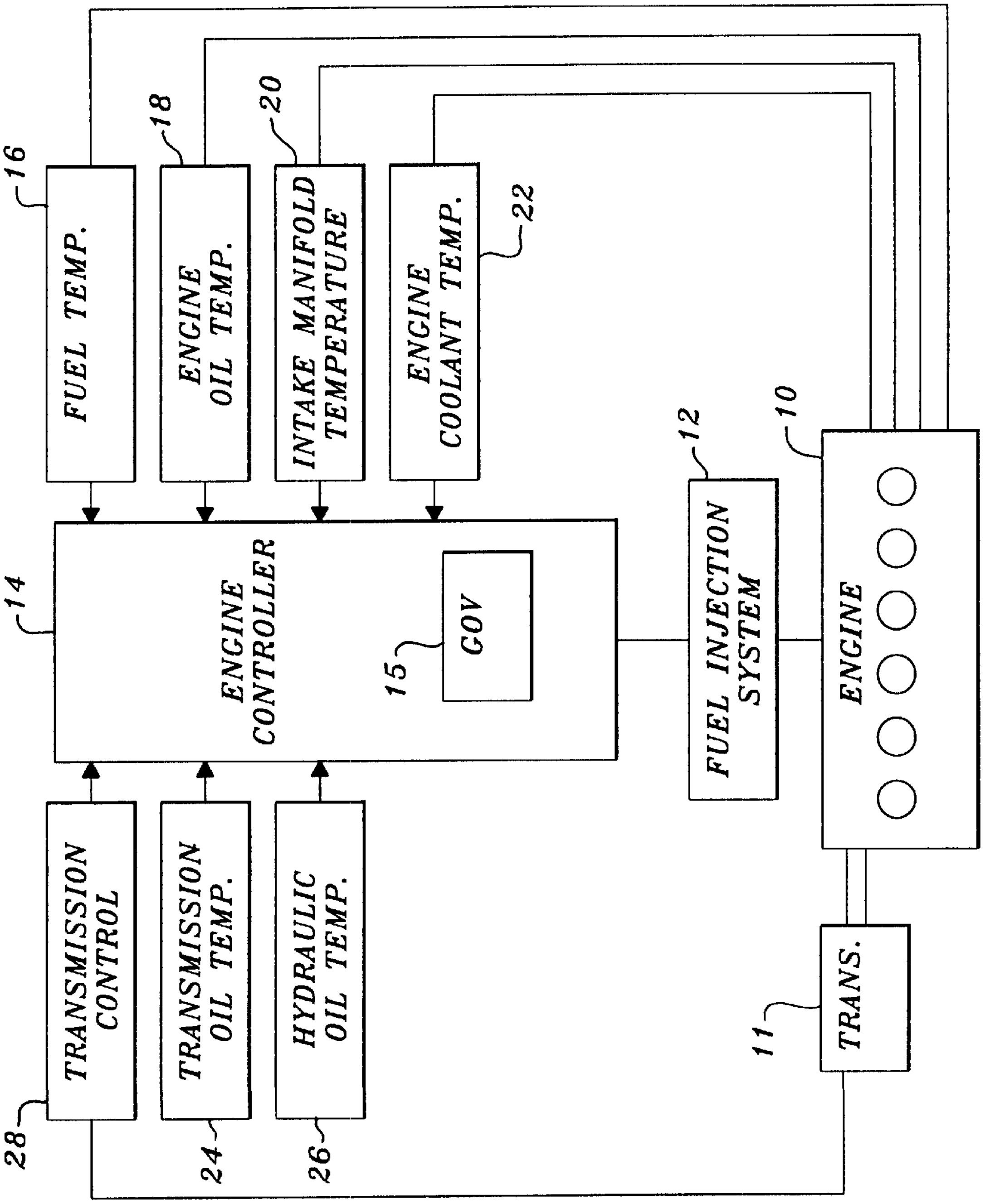
FIGS. 1A–1D are simplified schematic diagrams of alternate embodiments of a control system according to the present invention.

Referring to FIG. 1A, an internal combustion engine 10, such as a compression-ignition engine which is normally controlled to run at throttle-selected constant engine speed up to a normal or rated engine speed, receives fuel from a fuel injection system 12 which is controlled by an engine controller 14. The engine drives a transmission 11 which is controlled by a transmission controller 28. Engine controller 14 includes a conventional governor 15, and receives signals from a fuel temperature sensor 16, an engine oil temperature sensor 18, an intake manifold temperature sensor 20, an engine coolant temperature sensor 22, a transmission oil temperature signal from a transmission oil temperature sensor 24, and a hydraulic oil temperature signal from a hydraulic oil temperature sensor 26. The controller 14 also receives a gear ratio signal from the transmission controller 28, or the gear ratio could be calculated from engine speed and drive shaft speed or vehicle speed, as shown in FIGS. 1B and 1C.

Figure 1B:
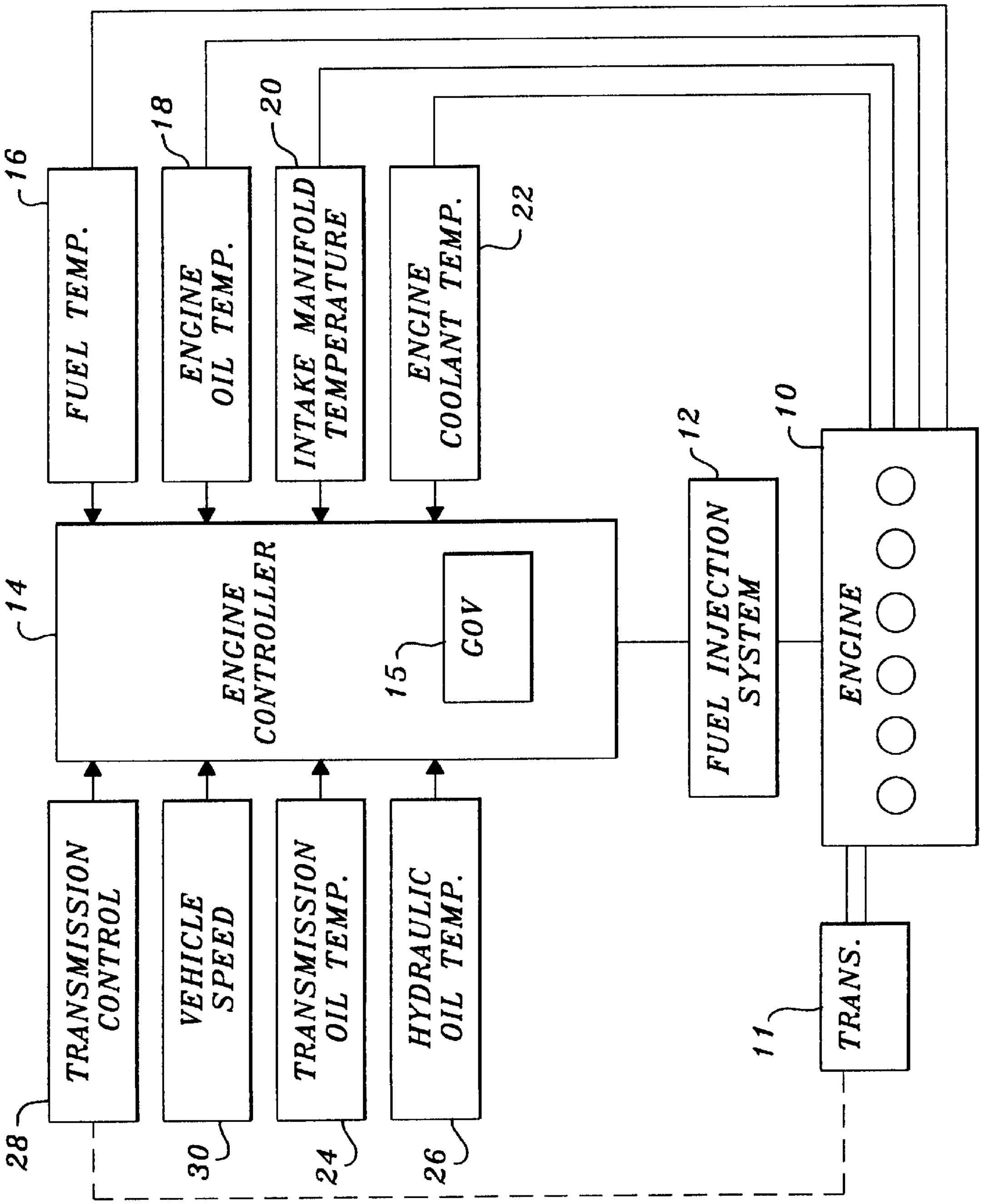

Referring to FIG. 1B, the embodiment of FIG. 1B is similar to that of FIG. 1A, except that in the FIG. 1B embodiment, the controller 14 also receives a vehicle speed signal from a vehicle speed sensor 30, such as a ground speed radar or non-driven wheel speed sensor.

Figure 1C:
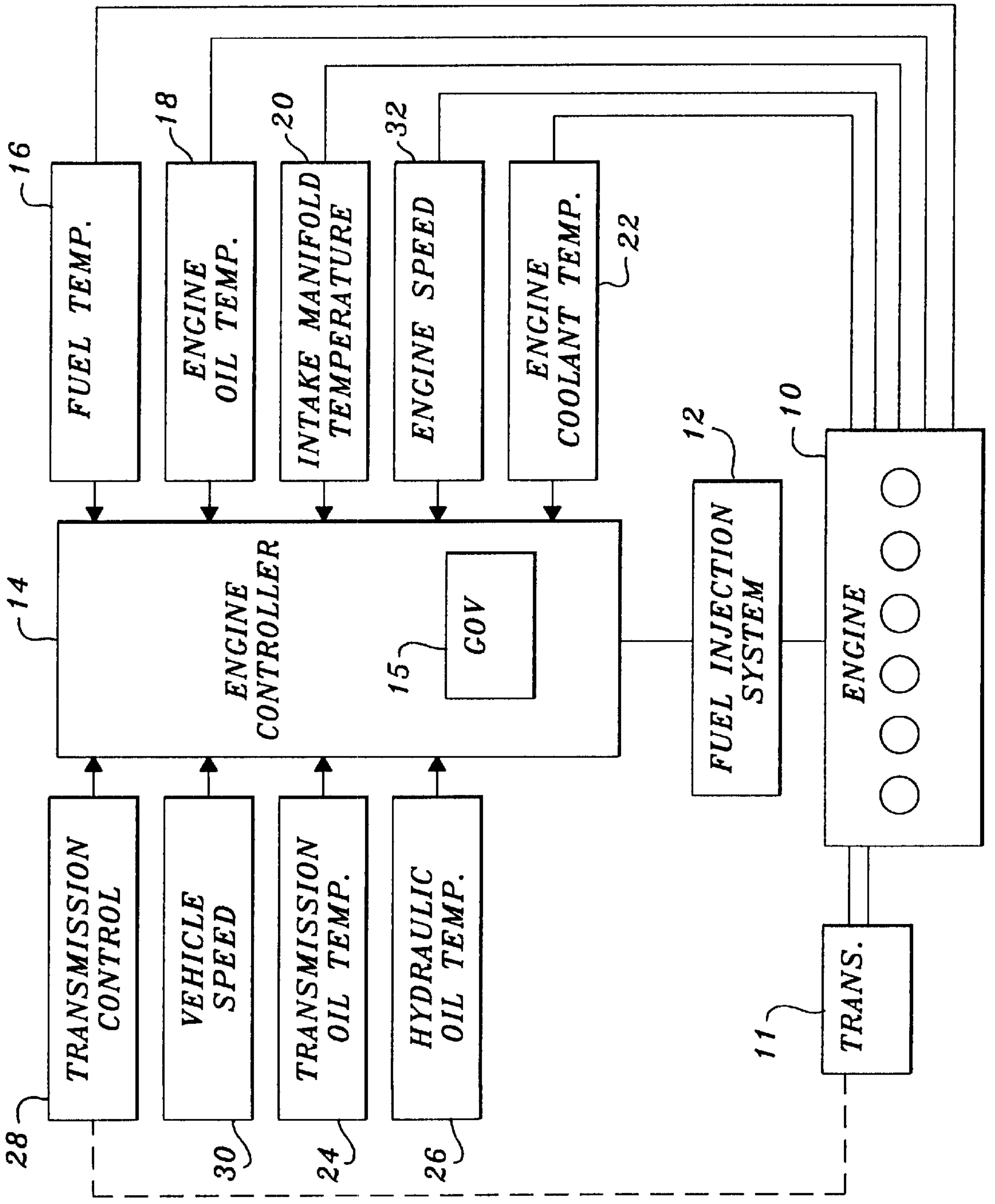

Referring to FIG. 1C, the embodiment of FIG. 1C is similar to that of FIG. 1A, except that in the FIG. 1C embodiment, the controller 14 also receives a vehicle speed signal from a vehicle speed sensor 30 and an engine speed signal from an engine speed sensor 32.

Figure 1D:
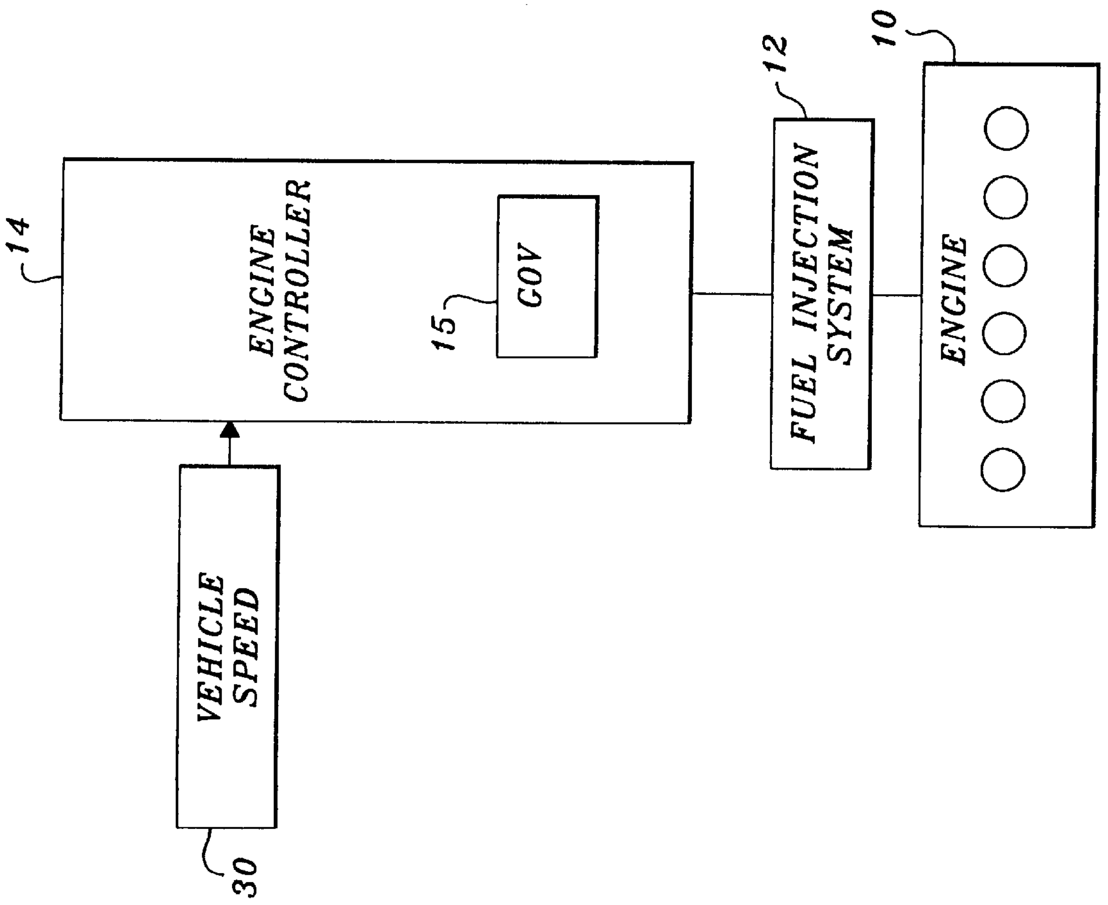

Referring to FIG. 1D, the embodiment of FIG. 1D is similar to that of FIG. 1A, except that in the FIG. 1D embodiment, the controller 14 receives only a vehicle speed signal from a vehicle speed sensor 30, such as a ground speed radar or non-driven wheel speed sensor.

The controller 14 executes one of the algorithms represented by the flow charts shown in FIGS. 2–7. The conversion of these flow charts into a standard language for implementing the algorithms described by the flow charts in a digital computer or microprocessor, will be evident to one with ordinary skill in the art.

Figure 2:
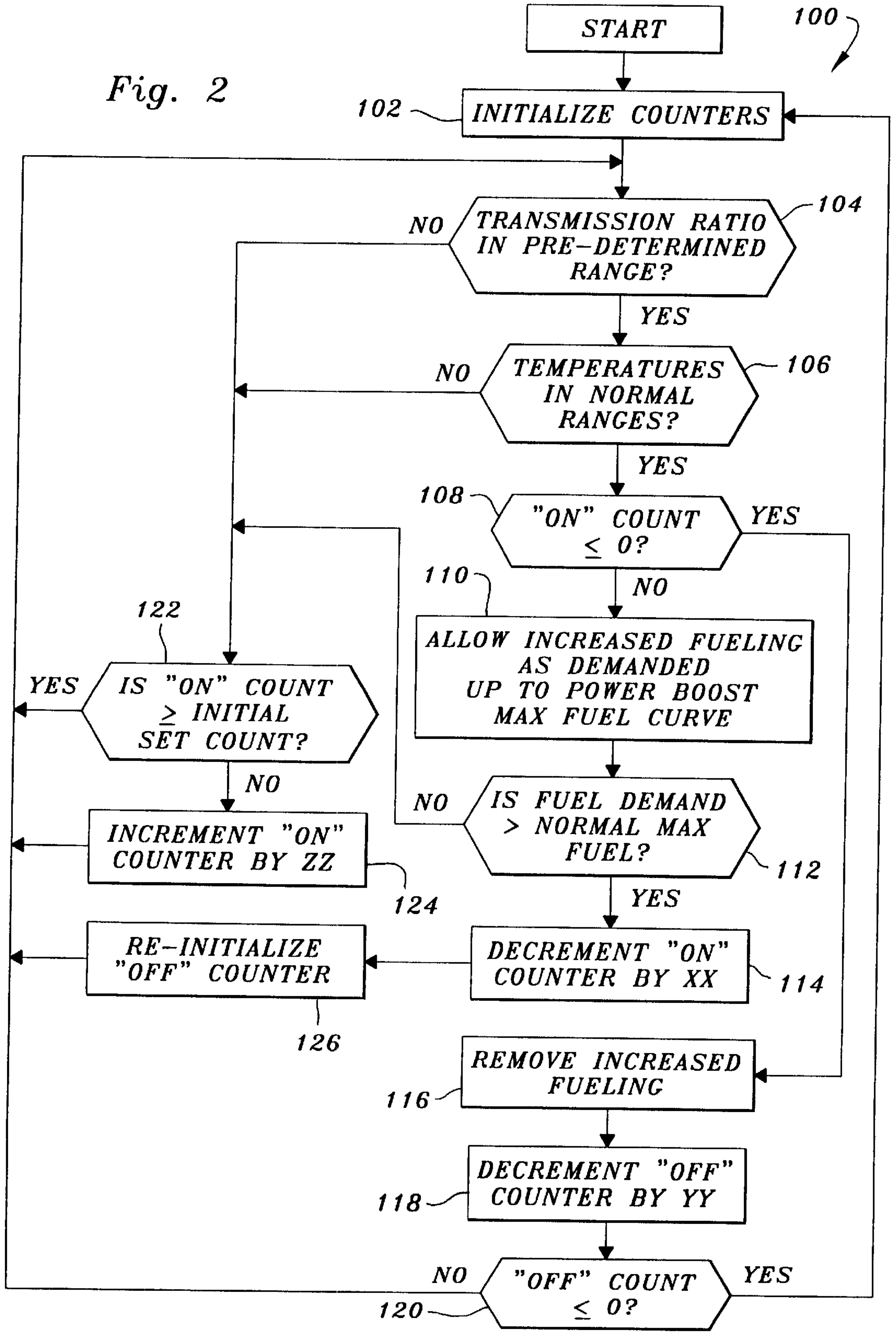
FIG. 2 is logic flow diagram illustrating an algorithm executed by the engine controller of FIG. 1A.

Referring now to FIGS. 1A and 2, upon power-up, or turning the ignition switch (not shown) on, the algorithm 100 starts at step 102, which initializes an ON timer or counter value and an OFF timer or counter value to predetermined values representing desired time periods. Preferably, the ON timer or counter value is initialized to a value representing a time period such as 2 minutes, and the OFF timer or counter value is initialized to a value representing a time period such as 4 minutes.

Step 104 directs the algorithm to step 122 if the gear ratio signal from 28 indicates that the transmission 11 is not in a predetermined range. If the transmission 11 is in the range, step 104 directs the algorithm to step 106. For example, viewing FIG. 9, with a 16-speed transmission, power boost may be enabled for gears 14 and higher and disabled for gears 13 and lower.

Step 106 directs the algorithm to step 122 if the temperatures sensed by sensors 16–26 are not in normal ranges. If the temperatures are in normal ranges, step 106 directs the algorithm to step 108.

Step 108 directs the algorithm to step 116 (to disable power boost) if the ON count is less than or equal to zero (On time period expired). If the ON count is greater than zero, step 108 directs the algorithm to step 110.

Step 110 enables power boost (by a predetermined amount such as 5 to 10 percent) or increased fueling of the engine 10 as demanded by the governor 15, such as when a speed control (not shown) commands a higher speed than is normally achieved under the circumstances, up to a fuel quantity determined by a power boost max fuel curve, which preferably represented by a look-up table (not shown) stored in the engine controller 14. For example, when the tractor is traveling down a road during transport and starts going up a hill while the engine is already running at a normal maximum rated power level, the governor 15 will maintain the engine speed constant by increasing engine power to a power level greater than the normal maximum rated power level.

Step 112 directs the algorithm to step 114 if the fuel demanded is greater than a normal max fuel value. If the fuel demanded is not greater than a normal max fuel value, step 112 directs the algorithm to step 122.

Figure 11:
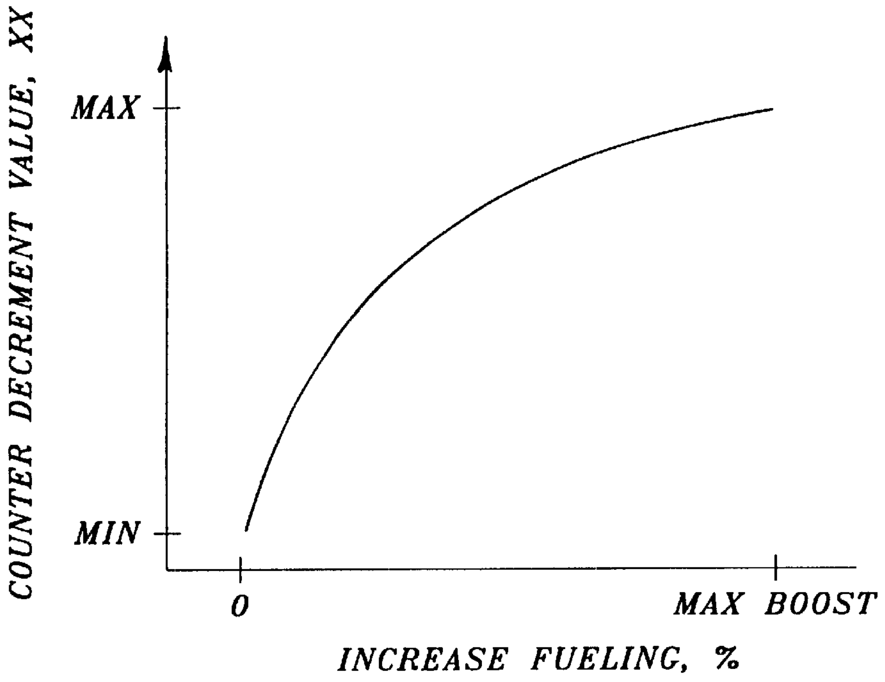
FIG. 11 is a graphical representation of the relationship between power boost on time and the magnitude of power boost.

Step 114 decrements the ON counter value by a counter decrement value, XX. Counter decrement value, XX may be a fixed value, or it may a variable value. For example, Counter decrement value, XX may be variable from a minimum to a maximum value as a function of the increased fueling percentage, as illustrated by FIG. 11.

Step 116 to disable power boost and terminates increased fueling.

Step 118 decrements the OFF counter by a counter decrement value YY, and directs the algorithm to step 120. Counter decrement value YY may be a fixed value, or it may a variable value, similar to counter decrement value XX.

Step 120 directs the algorithm to step 102 if the OFF counter value indicates that the OFF timer period has expired. If the OFF timer period has not expired, step 120 directs the algorithm to step 104.

Step 122 directs the algorithm to step 104 if the ON count is greater than or equal to an initial set count, else to step 124.

Step 124 increments the ON counter by a counter increment value ZZ, and directs the algorithm to step 104. Counter increment value ZZ may also be a fixed value, or it may a variable value, similar to counter decrement value XX.

Step 126 re-initializes the OFF counter and directs the algorithm to step 104. Thus, algorithm 100 enables engine power boost for a limited, spaced apart time period whenever the transmission (not shown) is in a higher gear ratio and sensed temperatures are in normal ranges.

Figure 3:
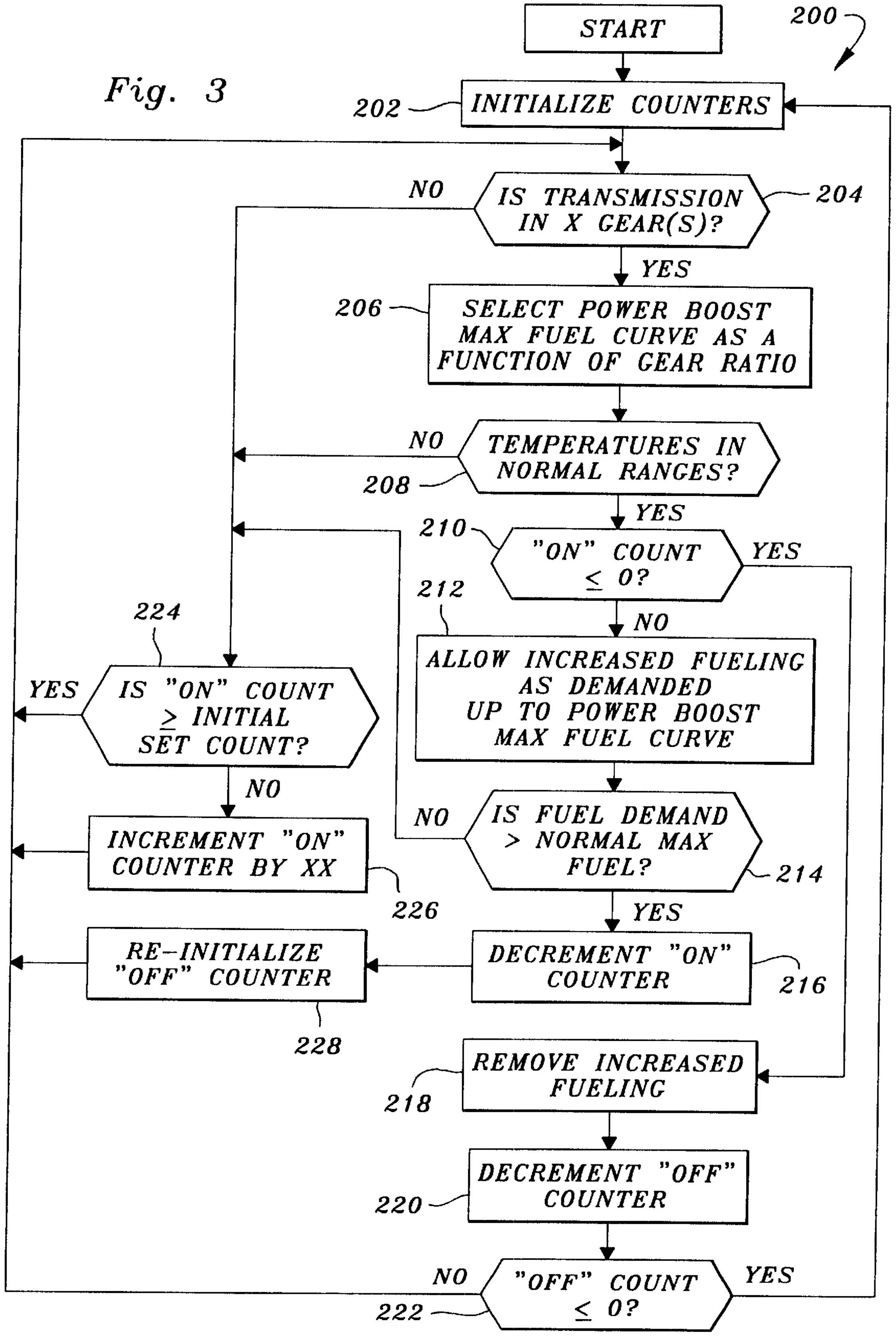
FIG. 3 is logic flow diagram illustrating an alternate embodiment of an algorithm executed by the engine controller of FIG. 1A.

Referring now to FIGS. 1A and 3, upon power-up, or turning the ignition switch (not shown) on, the algorithm 200 starts at step 202, which initializes an ON timer or counter value and an OFF timer or counter value to predetermined values representing desired time periods. Preferably, the ON timer or counter value is initialized to a value representing a time period such as 2 minutes, and the OFF timer or counter value is initialized to a value representing a time period such as 4 minutes.

Step 204 directs the algorithm to step 224 if the gear ratio signal from transmission controller 28 indicates that the transmission 11 is not in certain gears. If the transmission 11 is in these certain gears, step 204 directs the algorithm to step 206 (which enables engine power boost). Step 206 selects a power boost max fuel engine performance curve or operating characteristic as a function of the gear ratio signal from 28 and from information stored (such as in a look-up table, not shown) in the engine controller 14. For example, viewing FIG. 9, with a 16-speed transmission, power boost may be enabled for gears 14 and higher and disabled for gears 13 and lower. Different amounts of power boost can be enabled for different gears. For example, also viewing FIG. 9, the amount of power boost preferably decreases as the gear ratio increases.

Step 208 directs the algorithm to step 224 if the temperatures sensed by sensors 16–26 are not in normal ranges. If the temperatures are in normal ranges, step 208 directs the algorithm to step 210.

Step 210 directs the algorithm to step 218 (to prevent power boost) if the ON count is less than or equal to zero. If the ON count is greater than zero, step 210 directs the algorithm to step 212.

Step 212 enables power boost or increased fueling of the engine 20 as demanded by the governor 15, up to a fuel quantity determined or limited by the power boost max fuel engine performance curve selected at step 206.

If the fuel demanded by governor 15 is not greater than a normal max fuel value (power boost is available, but not being used), step 214 directs the algorithm to step 224. If the fuel demanded by the governor 15 is greater than a normal max fuel value (power boost operating), step 214 directs the algorithm to step 216.

Step 216 decrements the ON counter value, and directs the algorithm to step 228. This counter decrement value may be a fixed or a variable value, similar to counter decrement value XX.

Step 218 removes increased fueling or disables power boost.

Step 220 decrements the OFF counter.

Step 222 directs the algorithm to step 202 if the OFF counter value is less than or equal to zero (Off time period expired). If the OFF counter value is not less than or equal to zero (Off time period not expired), step 222 directs the algorithm to step 204.

Step 224 directs the algorithm to step 204 if the ON counter value is greater than or equal to an initial set count, else to step 226.

Step 226 increments the ON counter value by counter increment value XX and directs the algorithm to step 204.

Step 228 re-initializes the OFF counter value and directs the algorithm to step 204.

Thus, algorithm 200 enables engine power boost for limited, spaced apart time periods whenever the transmission 11 is in a higher gear ratio and sensed temperatures are in normal ranges, and selects a maximum fuel level as a function of the gear ratio of the transmission 11.

Figure 4:
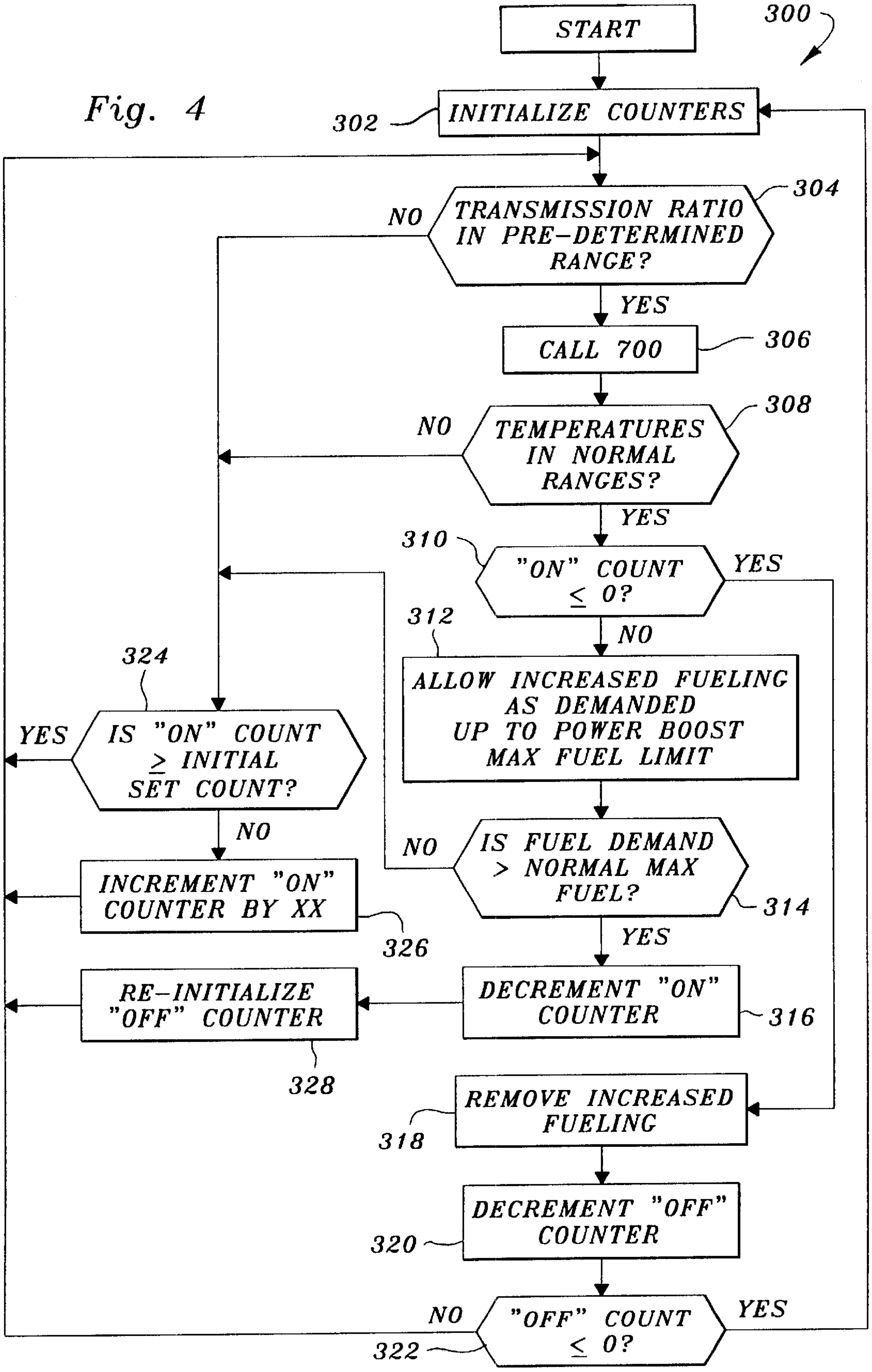
FIG. 4 is logic flow diagram illustrating an alternate embodiment of an algorithm executed by the engine controller of FIG. 1B.

Referring now to FIGS. 1B and 4, upon power-up, or turning the ignition switch (not shown) on, the algorithm 300 starts at step 302, which initializes an ON timer or counter value and an OFF timer or counter value to predetermined values representing desired time periods. Preferably, the ON timer or counter value is initialized to a value representing a time period such as 2 minutes, and the OFF timer or counter value is initialized to a value representing a time period such as 4 minutes.

Step 304 directs the algorithm to step 324 if the gear ratio signal from transmission controller 28 indicates that the transmission 11 is in a predetermined range of its available gear ratios. If the transmission 11 is in this range of gears, power boost is enabled and step 304 directs the algorithm to step 306.

Step 306 calls subroutine 700 (FIG. 8) which selects a power boost level as a function of the vehicle speed signal from sensor 30. Preferably, subroutine 700 operates to enable different amounts of power boost when sensed vehicle speed is above corresponding "on" limit speed and the respective amount of power boost operation when sensed vehicle speed is below corresponding "off" limit speeds, which are preferably 3–5 kph lower than the "on" limit speeds. Subroutine 700 is described in more detail below with reference to FIG. 8.

Step 308 directs the algorithm to step 324 if the temperatures sensed by any of sensors 16–26 are not in normal ranges. If the temperatures are in normal ranges, step 306 directs the algorithm to step 310.

Step 310 directs the algorithm to step 318 (to disable power boost) if the ON count is less than or equal to zero (the ON period has expired). If the ON count is greater than zero, step 310 directs the algorithm to step 312.

Step 312 enables power boost or increased fueling of the engine 30 as demanded by the governor 15, up to a maximum level, such as determined by a look-up table stored in the engine controller 14.

Step 314 directs the algorithm to step 324 if the fuel demanded is not greater than a normal max fuel value. If the fuel demanded is not greater than a normal max fuel value, step 314 directs the algorithm to step 316.

Step 316 decrements the ON counter value, and directs the algorithm to step 328. This counter decrement value may be a fixed or a variable value, similar to counter decrement value XX.

Step 318 removes increased fueling, thereby disabling power boost.

Step 320 decrements the OFF counter.

Step 322 directs the algorithm to step 302 (to re-enable power boost) if the OFF counter value is less than or equal to zero (OFF time period expired). If the OFF counter value is greater than zero, step 322 directs the algorithm to step 304.

Step 324 directs the algorithm to step 304 if the ON counter value is greater than or equal to an initial set count. If the ON counter value is greater than the initial value, step 324 directs the algorithm to step 326.

Step 326 increments the ON counter by XX and directs the algorithm to step 304.

Step 328 re-initializes the OFF counter and directs the algorithm to step 304.

Thus, algorithm 300 enables engine power boost for limited, spaced apart time periods whenever the transmission 11 is in a higher gear ratio and sensed temperatures are in normal ranges, and selects a power boost level as a function of the sensed vehicle speed.

Figure 5:
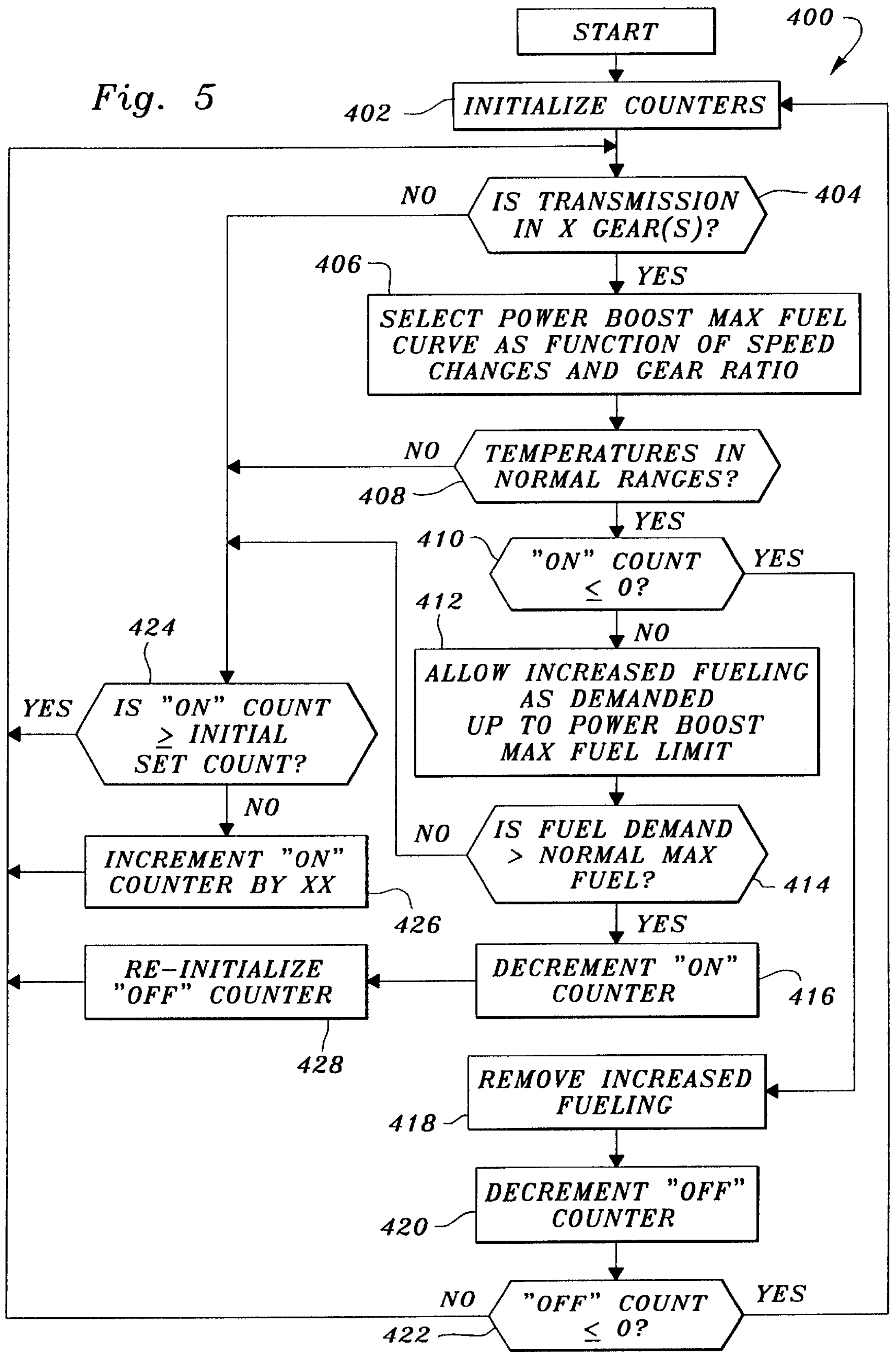
FIG. 5 is logic flow diagram illustrating an alternate embodiment of an algorithm executed by the engine controller of FIG. 1C.

Referring now to FIGS. 1C and 5, upon power-up, or turning the ignition switch (not shown) on, the algorithm 400 starts at step 402, which initializes an ON timer or counter value and an OFF timer or counter value to predetermined values representing desired time periods. Preferably, the ON timer or counter value is initialized to a value representing a time period such as 2 minutes, and the OFF timer or counter value is initialized to a value representing a time period such as 4 minutes.

Step 404 directs the algorithm to step 424 if the gear ratio signal from transmission controller 28 indicates that the transmission 11 is not in certain gears. If the transmission 11 is in such certain gears, step 404 directs the algorithm to step 406.

Step 406 selects an amount of power boost as a function of the change (increase or decrease) per unit of time (slew rate) of a speed parameter, such as sensed vehicle or engine speed from sensor 30 or 32. For example, viewing FIG. 9, with a 16-speed transmission, the amount of power boost may be varied or selected as a function of the "slew rate" and as a function of the gear ratio of the transmission 11. Preferably, the amount of power boost increases for higher negative "slew rate", and preferably decreases as the gear ratio decreases. When the "slew rate" is zero or positive, the power boost may be zero increase or it may be an increase, but less than when the "slew rate" is negative.

Step 408 directs the algorithm to step 424 if the temperatures sensed by any of sensors 16–26 are not in normal ranges. If the temperatures are in normal ranges, step 406 directs the algorithm to step 410.

Step 410 directs the algorithm to step 418 (to disable power boost) if the ON count is less than or equal to zero. If the ON count is greater than zero, step 410 directs the algorithm to step 412.

Figure 6:
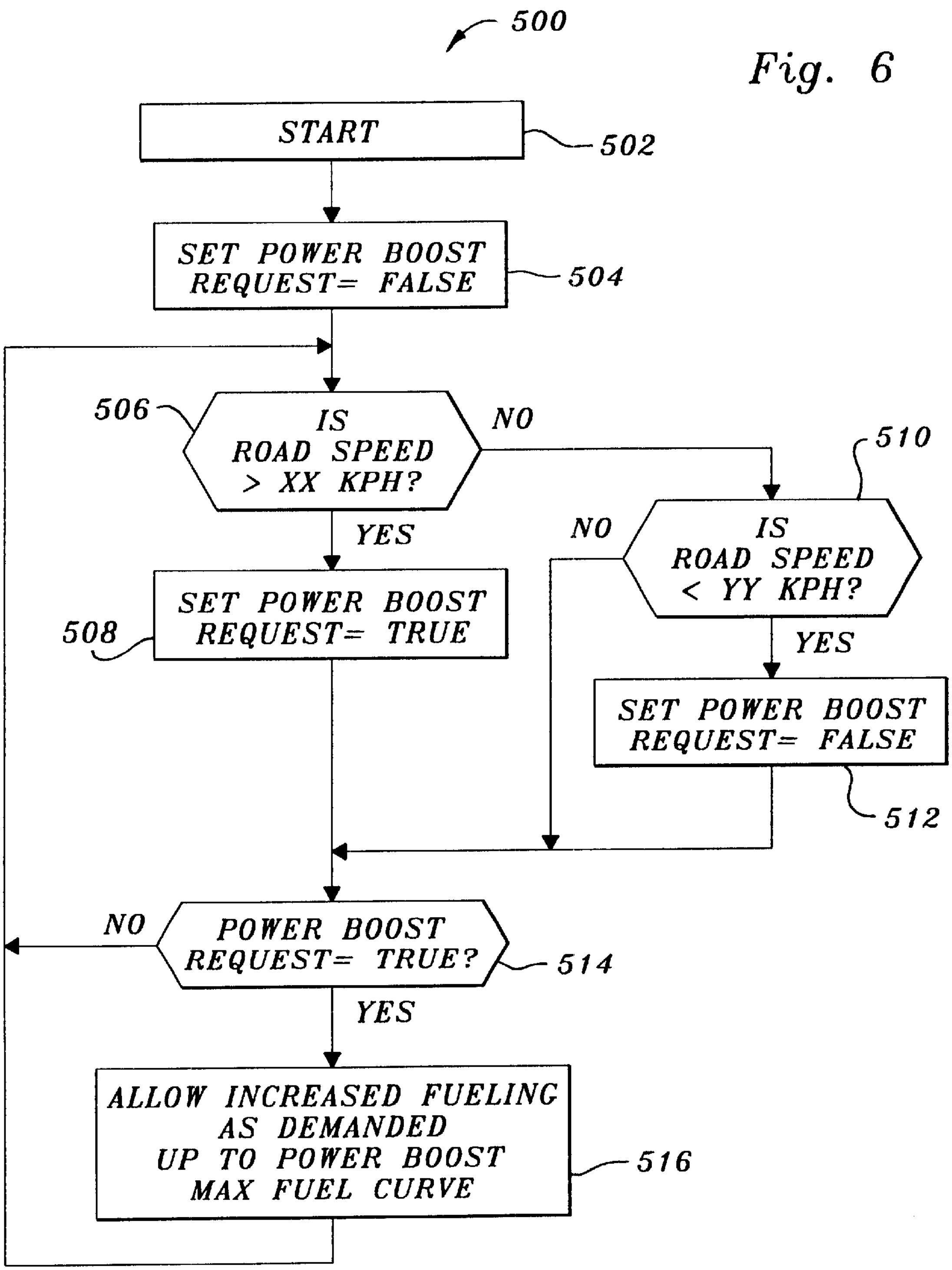
FIG. 6 is logic flow diagram illustrating an alternate embodiment of an algorithm executed by the engine controller of FIG. 1D.

Step 412 enables power boost of the engine 40 as demanded by the governor 15, and increases the fuel quantity by determined by a power boost max fuel curve, which preferably represented by a look-up table stored in the engine controller 14 as shown in FIG. 6.

Step 414 directs the algorithm to step 424 if the fuel demanded is not greater than a normal max fuel value. If the fuel demanded is greater than a normal max fuel value, step 414 directs the algorithm to step 416.

Step 416 decrements the ON counter value and directs the algorithm to step 428. This counter decrement value may be a fixed or a variable value, similar to counter decrement value XX.

Step 418 removes increased fueling and disables power boost.

Step 420 decrements the OFF counter.

Step 422 directs the algorithm to step 402 (to re-enable power boost) if the OFF counter value is less than or equal to zero (the OFF time period has expired). If the OFF counter value is greater than zero, step 422 directs the algorithm to step 404.

Step 424 directs the algorithm to step 404 if the ON counter value is greater than or equal to an initial set count. If the ON counter value is less than this initial value, step 424 directs the algorithm to step 426.

Step 426 increments the ON counter by XX and directs the algorithm to step 404.

Step 428 re-initializes the OFF counter and directs the algorithm to step 404.

Thus, algorithm 400 enables engine power boost for limited, spaced apart time periods whenever the transmission 11 is in a higher gear ratio and sensed temperatures are in normal ranges, and selects a maximum fuel level as a function of the change per unit of time of a sensed vehicle or engine speed parameter.

Referring now to FIGS. 1D and 6, upon power-up, or turning the ignition switch (not shown) on, the algorithm 500 starts at step 502. Step 504 sets a power boost request flag equal to false in order to disable power boost upon startup.

Step 506 directs the algorithm to step 510 if the sensed vehicle road speed is not greater than a first threshold, such as 30 kph (above which is considered to be a transport speed for an agricultural tractor). If the sensed vehicle road speed is greater than the first threshold, step 506 directs the algorithm to step 508.

Step 508 sets the power boost request flag as true and directs the algorithm to step 514.

Step 510 directs the algorithm to step 514 if the sensed vehicle road speed is not less than a second, lower threshold, such as 25 kph (below which is considered to be slower than a transport speed for an agricultural tractor). If the sensed vehicle road speed is less than the second threshold, step 510 directs the algorithm to step 512.

Step 512 sets the power boost request flag as false and directs the algorithm to step 514.

Step 514 directs the algorithm back to step 506 if the power boost request flag is not true, and directs the algorithm to step 516 if the power boost request flag is true.

Step 516 enables power boost of the engine 40 as demanded by the governor 15, which may increase the fuel quantity delivered to the engine by a certain amount up to a power boost maximum amount, which is preferably represented by a look-up table (not shown) stored in the engine controller 14.

Thus, algorithm 500 automatically enables engine power boost if sensed road speed is greater than a first or "on" threshold, above which is considered to be a transport speed, and disables power boost if sensed road speed is less than a second or "off" threshold, below which is considered to be less than a transport speed.

Figure 7:
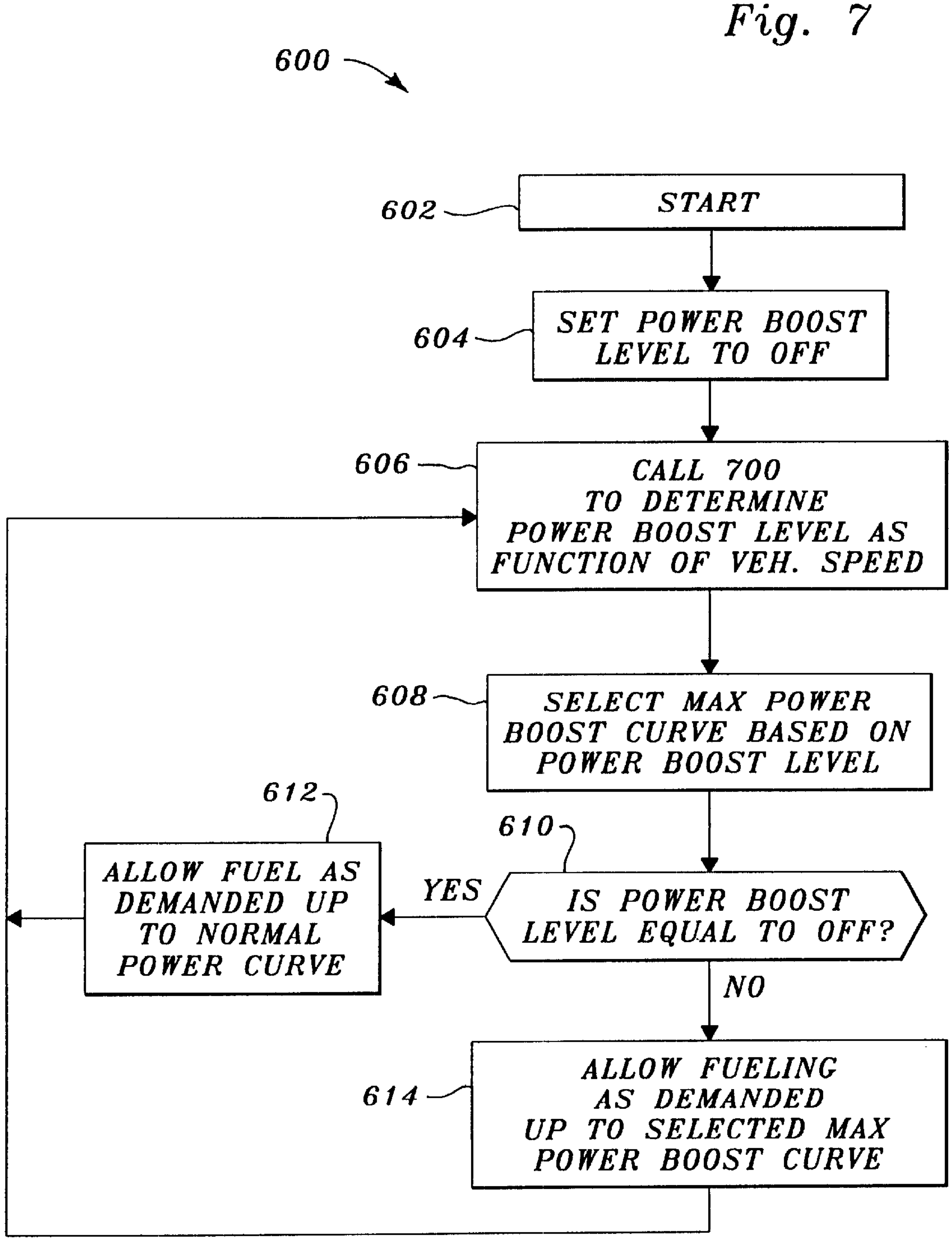
FIG. 7 is logic flow diagram illustrating an alternate embodiment of an algorithm executed by the engine controller of FIG. 1D.

Referring now to FIGS. 1D and 7, upon power-up, or turning the ignition switch (not shown) on, the algorithm 600 starts at step 602. Step 604 disables power boost by setting a power boost level flag to off.

Step 606 reads the sensed vehicle speed from sensor 30 and calls subroutine 700 (FIG. 8), which determines a particular power boost level, such as 1, 2, 3, etc., as a function of the sensed vehicle speed and of a plurality of ON and OFF transport speed thresholds. Control is then returned to step 606, which then directs the algorithm to step 608.

Step 608 selects a particular maximum power boost characteristic or curve (from a plurality of stored curves) based on the output of steps 608 and sub-routine 700.

Step 610 directs the algorithm to step 612 if the power boost level is off, otherwise step 610 directs the algorithm to step 614.

Step 612 disables power boost and permits fueling of the engine 10 only up to normal power levels associated with a normal stored engine power characteristic or curve.

Step 614 enables power boost and permits fueling of the engine 10 up to higher than normal power levels associated with the power boost engine power curve selected by steps 608 and 700.

From steps 612 and 614, the algorithm returns to step 606.

Thus, algorithm 600 automatically enables different amounts of engine power boost as a function of sensed road speed and a plurality of sets or pairs of "on" and "off" transport speed thresholds.

Figures 8, 12:
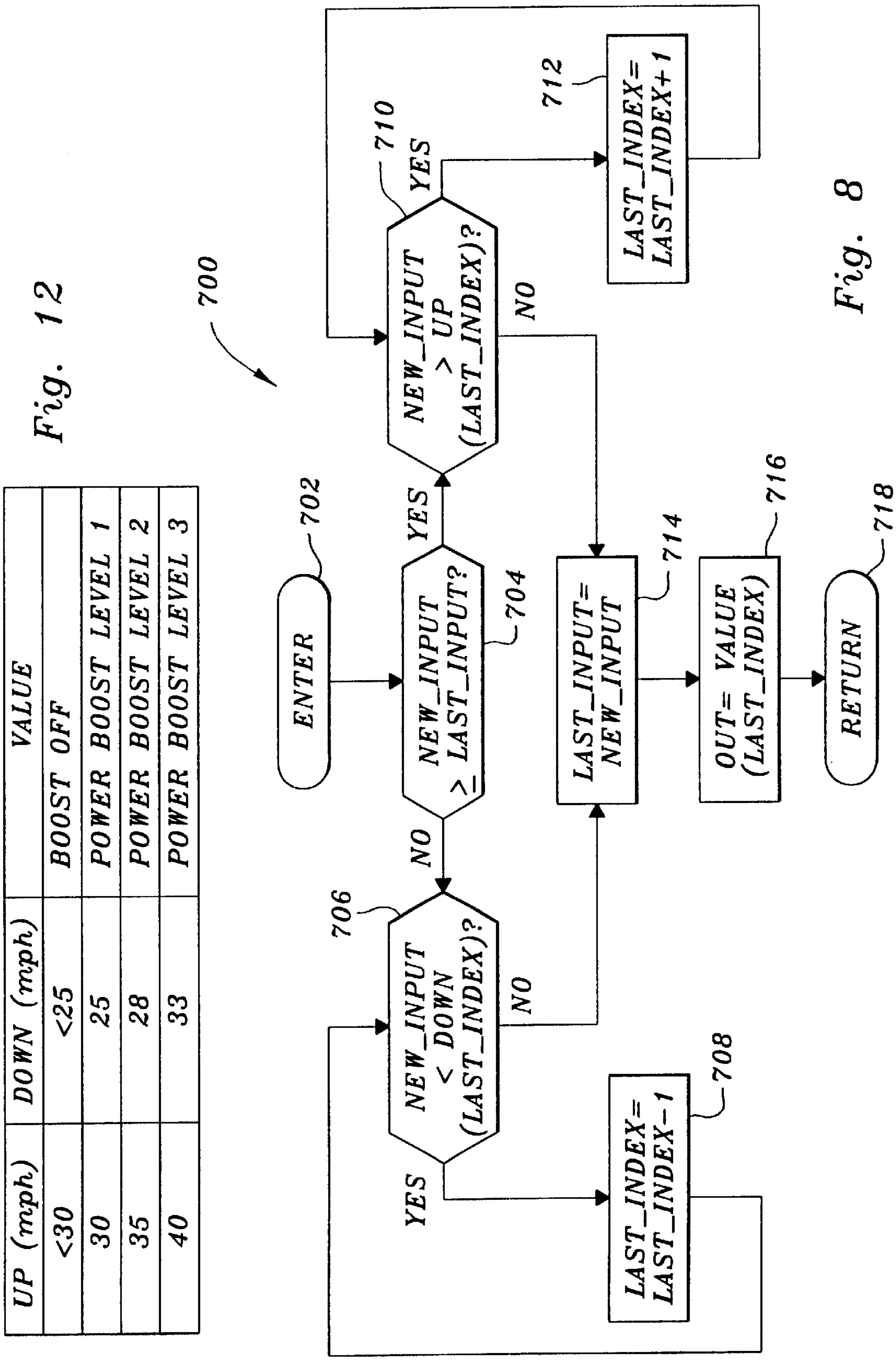
FIG. 8 is logic flow diagram illustrating a subroutine algorithm which may be called by the algorithms of FIGS. 2–5 and 7.
FIG. 12 is a tabular representation of a lookup table used in connection with the subroutine shown in FIG. 8.

Referring now to FIG. 8, the subroutine 700 may be called by a step in each of the algorithms 100–400. Algorithm 700 is entered at step 702, then step 704 determines if a New_Input value is greater than or equal to a Last_input value. If not, step 706 compares New_input to a Down (Last_Index) value. If New_Input is less than Down (Last_Index) value, step 708 sets Last_Index equal to (Last_Index−1) and returns control to step 706. If New_Input is not less than Down (Last_Index) value, step 714 sets Last_Input equal to New_Input and directs control to step 716

Referring again to step 704, if New_Input value is greater than or equal to Last_Input value, step 710 compares New_Input to a Up(Last_Index) value. If New _Input is greater than Up(Last_Index) value, step 712 sets Last_Index equal to (Last_Index−1) and returns control to step 710. If New_Input is not greater than Up(Last_Index) value, step 714 sets Last Input equal to New_Input and directs control to step 716.

Step 716 sets an Out value equal to Value(Last_Index) and step 718 returns control to the calling algorithm.

In connection with subroutine 700, Up(n) is an array of input values for which an output value is to be increased, Down(n) is an array of input values for which an output value is to be decreased, Value(n) are the output values for a data table as shown in FIG. 12.

Up(1)=30 KPH, Down(1)=25 KPH, Up(2)=35 KPH, Down(2)=28 KPH, Up(3)=40 KPH and Down(3)=33; and Value(0)=Power Boost Off, Value(1)=Power Boost Level 1, Value(2)=Power Boost Level 2, and Value(3)=Power Boost Level 3.

Figure 10:
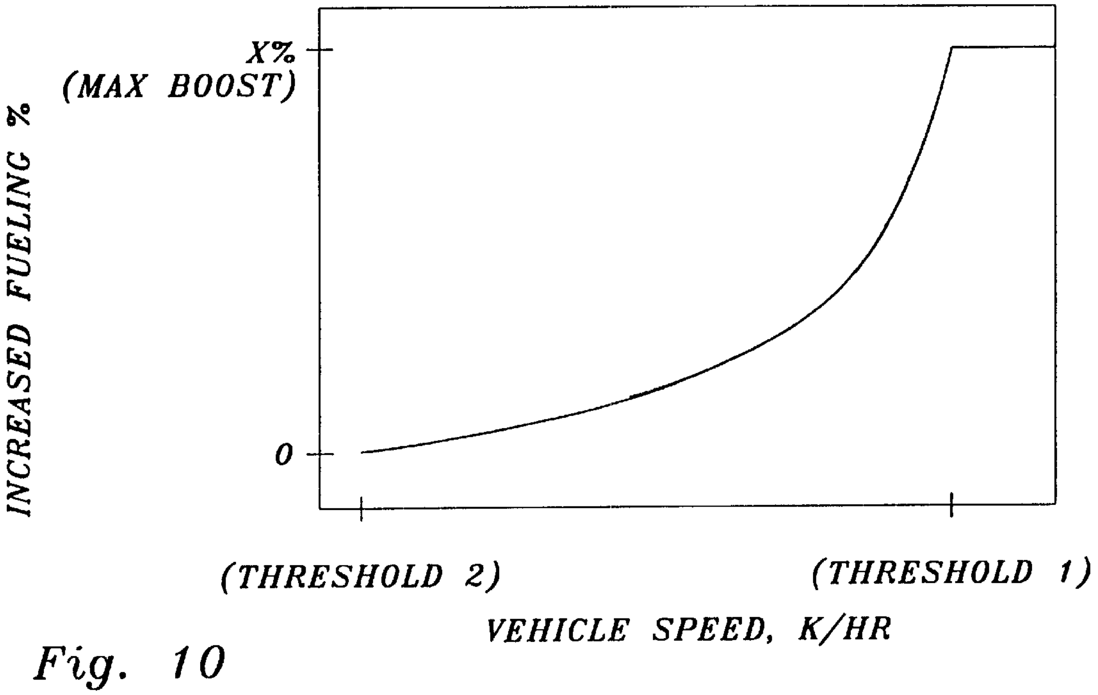
FIG. 10 is a graphical representation of a vehicle speed dependent function of the present invention.

Thus, algorithm 700 can be used so that different power boost on and off threshold speeds are associated with different amounts of power boost. An alternative is to use a function, as shown in FIG. 10, in place of steps 606 and 608, to calculate the maximum power boost as a function of travel speed.

FIG. 11 illustrates a possible relationship between a counter decrement value, XX, (or YY or ZZ) and the increased fueling percentage.

While the present invention has been described in conjunction with a specific embodiment, it is understood that many alternatives, modifications and variations will be apparent to those skilled in the art in light of the foregoing description. For example, it should also be understood that the controller 14 could also execute an algorithm which could be a combination of various features of the flow charts illustrated herein. Accordingly, this invention is intended to embrace all such alternatives, modifications and variations which fall within the spirit and scope of the appended claims.

What is claimed is:

1. A power boost control system for a utility vehicle having an internal combustion engine which drives a transmission having a plurality of gear ratios, the power boost control system comprising:

a control unit which receives a gear ratio signal representing a gear ratio of the transmission, the control unit enabling engine power boost if the gear ratio signal indicates that the transmission has a gear ratio higher than a predetermined gear ratio, the control unit disabling engine power boost if the gear ratio signal indicates that the transmission has a gear ratio lower than said predetermined gear ratio.

2. The power boost control system of claim 1, comprising:

a plurality of temperature sensors for sensing a plurality of temperatures associated with the engine or vehicle; and the control unit disabling engine power boost as a function of a comparison of the sensed temperatures with limit temperatures.

3. The power boost control system of claim 1, comprising:

a temperature sensor for sensing a temperature associated with the engine or vehicle; and the control unit disabling engine power boost if the sensed temperature exceeds a limit temperature.

4. The power boost control system of claim 3, wherein:

the temperature sensor comprises an engine oil temperature sensor.

5. The power boost control system of claim 3, wherein:

the temperature sensor comprises an intake manifold temperature sensor.

6. The power boost control system of claim 3, wherein:

the temperature sensor comprises an engine coolant temperature sensor.

7. The power boost control system of claim 3, wherein:

the temperature sensor comprises a transmission oil temperature sensor.

8. The power boost control system of claim 3, wherein:

the temperature sensor comprises a hydraulic oil temperature sensor.

9. The power boost control system of claim 1, wherein:

the control unit determines a maximum fuel amount as a function of the sensed gear ratio, and limits an amount of power boost as a function said sensed gear ratio.

10. The power boost control system of claim 1, comprising:

a vehicle speed sensor for sensing a speed of the vehicle; and the control unit controlling engine power boost as a function of the gear ratio signal and as a function of the sensed vehicle speed.

11. The power boost control system of claim 1, further comprising:

a vehicle speed sensor for sensing a speed of the vehicle; and the control unit enables power boost operation when sensed vehicle speed is above a first limit speed, and the control unit disables power boost operation when sensed vehicle speed is below a second limit speed, said first limit speed being higher than said second limit speed.

12. A power boost control system for a utility vehicle having an engine which is governor controlled to run at throttle-selected constant engine speed up to a normal or rated engine speed, the power boost control system comprising:

a vehicle speed sensor for generating a speed signal representing a travel speed of the vehicle; and a control unit which receives the speed signal, the control unit controlling engine power boost as a function of the speed signal, and automatically enabling engine power boost for a time period when vehicle speed is above a transport speed and disabling engine power boost when vehicle speed is below the transport speed, the control unit boosting engine power by a variable time period, said time period varying as a non-linear function of a magnitude of the engine power boost.

13. A power boost control system for a utility vehicle having an engine which is governor controlled to run at throttle-selected constant engine speed up to a normal or rated engine speed, the power boost control system comprising:

a vehicle speed sensor for generating a speed signal representing a travel speed of the vehicle; and a control unit which receives the speed signal, the control unit controlling engine power boost as a function of the speed signal, and automatically enabling engine power boost for a time period when vehicle speed is above a transport speed and disabling engine power boost when vehicle speed is below the transport speed, the control unit receiving an engine speed signal and boosting engine power by a variable magnitude, said magnitude varying as a function of a rate of change of engine speed.

14. A power boost control system for a utility vehicle having an engine which is governor controlled to run at throttle-selected constant engine speed up to a normal or rated engine speed, the power boost control system comprising:

a vehicle speed sensor for generating a speed signal representing a travel speed of the vehicle; and a control unit which receives the speed signal, the control unit controlling engine power boost as a function of the speed signal, and automatically enabling engine power boost for a time period when vehicle speed is above a transport speed and disabling engine power boost when vehicle speed is below the transport speed, the control unit receiving an engine speed signal and boosting engine power by a variable magnitude, said magnitude varying as a function of a rate of change of vehicle speed.

15. A power boost control system for a utility vehicle having an engine which is governor controlled to run at throttle-selected constant engine speed up to a normal or rated engine speed, the power boost control system comprising:

a vehicle speed sensor for generating a speed signal representing a travel speed of the vehicle; and a control unit which receives the speed signal, the control unit controlling engine power boost as a function of the speed signal, and automatically enabling engine power boost for a time period when vehicle speed is above a transport speed and disabling engine power boost when vehicle speed is below the transport speed, the control unit receiving an engine speed signal and boosting engine power by a variable magnitude, said magnitude varying as a function of a rate of change of a ratio of engine speed to vehicle speed.

* * * * *